United States Patent [19]
Teed

[11] 3,796,118
[45] Mar. 12, 1974

[54] CHANNEL CLOTH SLITTER
[75] Inventor: Richard K. Teed, Greenwood, S.C.
[73] Assignee: Riegel Textile Corporation, Ware Shoals, S.C.
[22] Filed: Apr. 10, 1972
[21] Appl. No.: 242,336

[52] U.S. Cl.................. 83/170, 83/404.4, 83/425.3, 83/444, 83/448
[51] Int. Cl............................................... B26d 3/00
[58] Field of Search............... 83/15, 170, 440–450, 83/373, 367, 368, 431, 425.2, 425.3, 404.4

[56] References Cited
UNITED STATES PATENTS

| | | | |
|---|---|---|---|
| 2,533,996 | 12/1950 | Clarkson | 83/367 |
| 3,566,726 | 3/1971 | Politis | 83/170 X |
| 2,776,711 | 1/1957 | Bas | 83/170 X |
| 1,678,458 | 7/1928 | Biggert, Jr. | 83/407 |
| 2,310,153 | 2/1943 | Rosenfarb | 83/170 X |
| 2,609,009 | 9/1952 | Haefliger | 83/368 X |
| 609,896 | 8/1898 | Morris | 83/444 |
| 2,910,122 | 10/1959 | Anderson et al. | 83/368 |
| 3,664,223 | 5/1972 | Brocklehurst | 83/368 |

*Primary Examiner*—J. M. Meister
*Attorney, Agent, or Firm*—Pennie & Edmonds

[57] ABSTRACT

There is disclosed an apparatus for slitting or separating a channel cloth backing between pile rows thereof, incorporating rotary knives or fixed blades and means for guiding the channel cloth during cutting.

6 Claims, 8 Drawing Figures

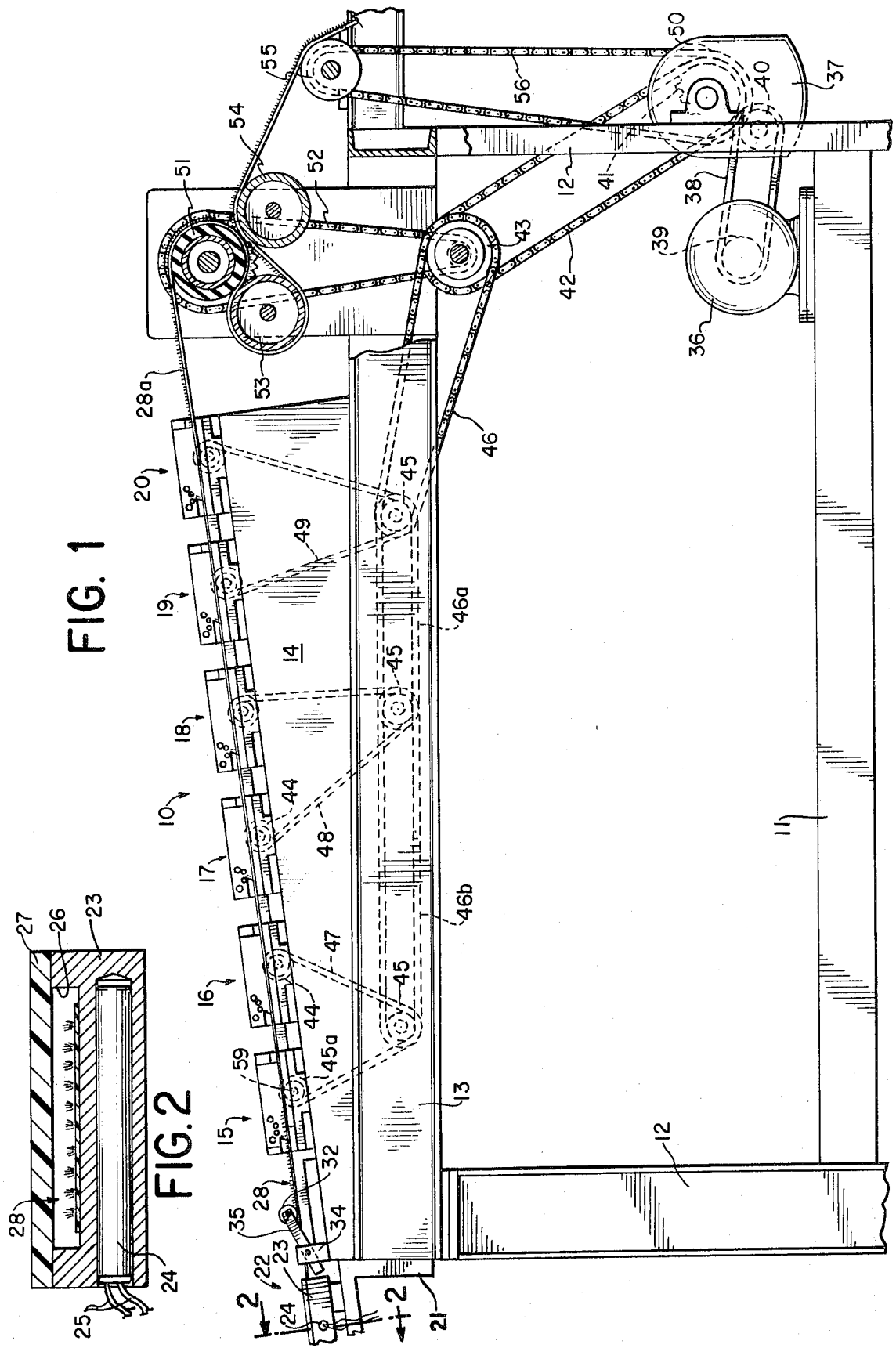

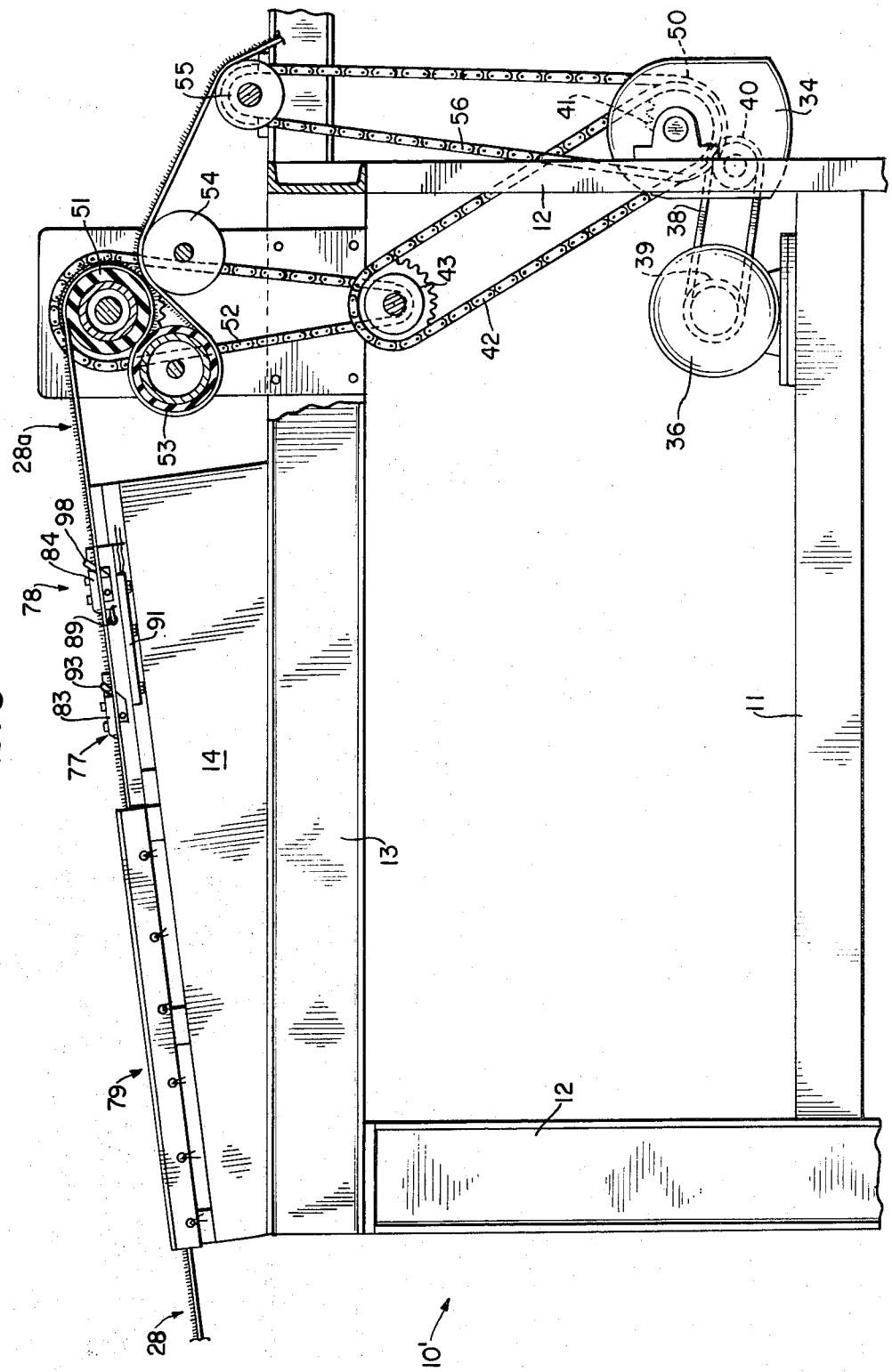

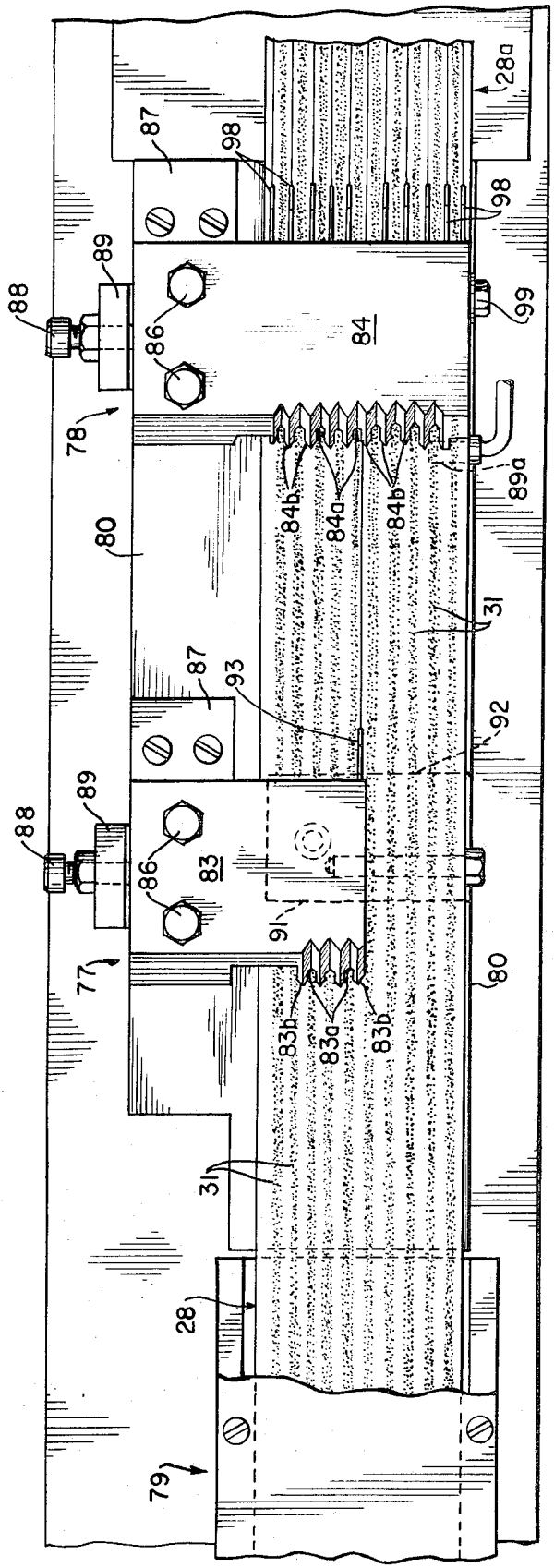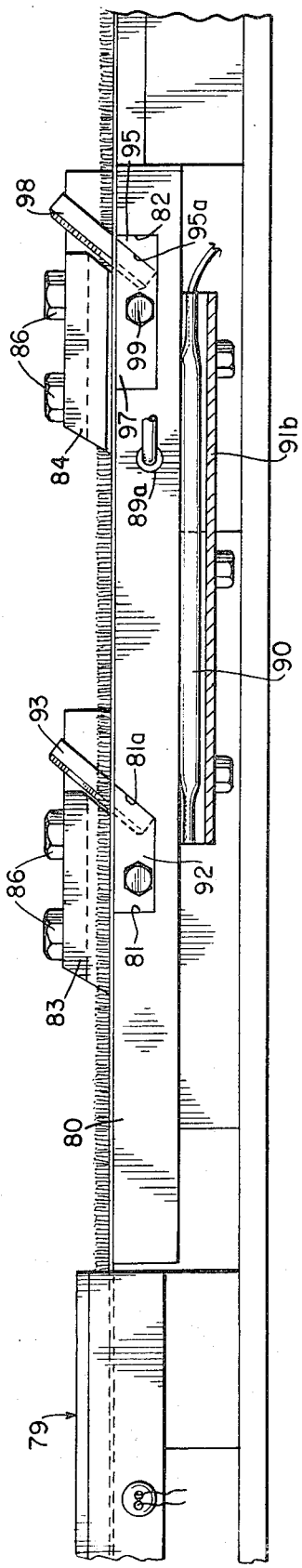

CHANNEL CLOTH SLITTER

BACKGROUND OF THE INVENTION

Channel cloth is conventionally woven as a backing layer of textile fabric from which project a plurality of weatherstripping pile rows. After treating the channel cloth backing by impregnating the backing with plastic or resin in order to provide stiffening and waterproofing thereof, separate strips of weatherstripping are produced by slitting the channel cloth backing intermediate the pile rows. It is important that the slitting operation be performed very accurately so that the weatherstripping will be accepted within the channels or grooves provided therefor in the frames of storm windows and doors.

It is the purpose of the present invention to provide improvements in apparatus for channel cloth slitting superior to apparatus heretofore known. Such apparatus generally includes a series of rotating blades located above and rotating toward the channel cloth strip to be processed. One of the defects of this form of apparatus was its inability to slit or cut between the rows within the close tolerances which would have been desirable. Thus, the line of the cut tended to vary and be somewhat erratic; edge distances to the pile center and overall widths of weatherstripping were not maintained properly; and the cut edges were not clean due to a characteristic crushing/cutting action of the blade.

SUMMARY OF THE INVENTION

The present invention provides an apparatus for slitting channel cloth wherein the channel cloth includes a textile backing coated on one side with plastic and impregnated with said plastic, the backing having a plurality of parallel rows of weatherstripping pile projecting from the other side thereof, and the apparatus includes means for guiding the channel cloth by contact with a pile row, a cutter for slitting the backing intermediate the pile rows to form separate strips of weatherstripping, the improvement comprising, a planar cutting surface, means for drawing the channel cloth along the guide surface with the plastic coated side in contact with the guide surface, bifurcated guide means straddling at least one of the rows of pile, a knife spaced laterally from the center of the guide means, means for locating the knife beneath said guide surface and means for inclining the edge of said knife in the direction of travel of said channel cloth.

In two embodiments of the invention, a plurality of rotary knives are provided in staggered series relationship; and a gang slitter incorporating stationary blades perform simultaneous slitting of weatherstripping. In each application, means are provided for heating the plastic backing prior to slitting thereof.

BRIEF DESCRIPTION OF THE DRAWING

FIG. 1 is a side elevation of one form of slitting apparatus in accordance with the present invention;

FIG. 2 is a cross section taken in the direction of arrows 2—2 of FIG. 1;

FIG. 5 is a side elevation of an alternate form of channel cloth slit in accordance with the present invention;

FIG. 6 is an enlarged plan view of portions of the apparatus of FIG. 5;

FIG. 7 is a side view of the apparatus shown in FIG. 6; and

DESCRIPTION OF PARTICULAR EMBODIMENTS

Figure 3:
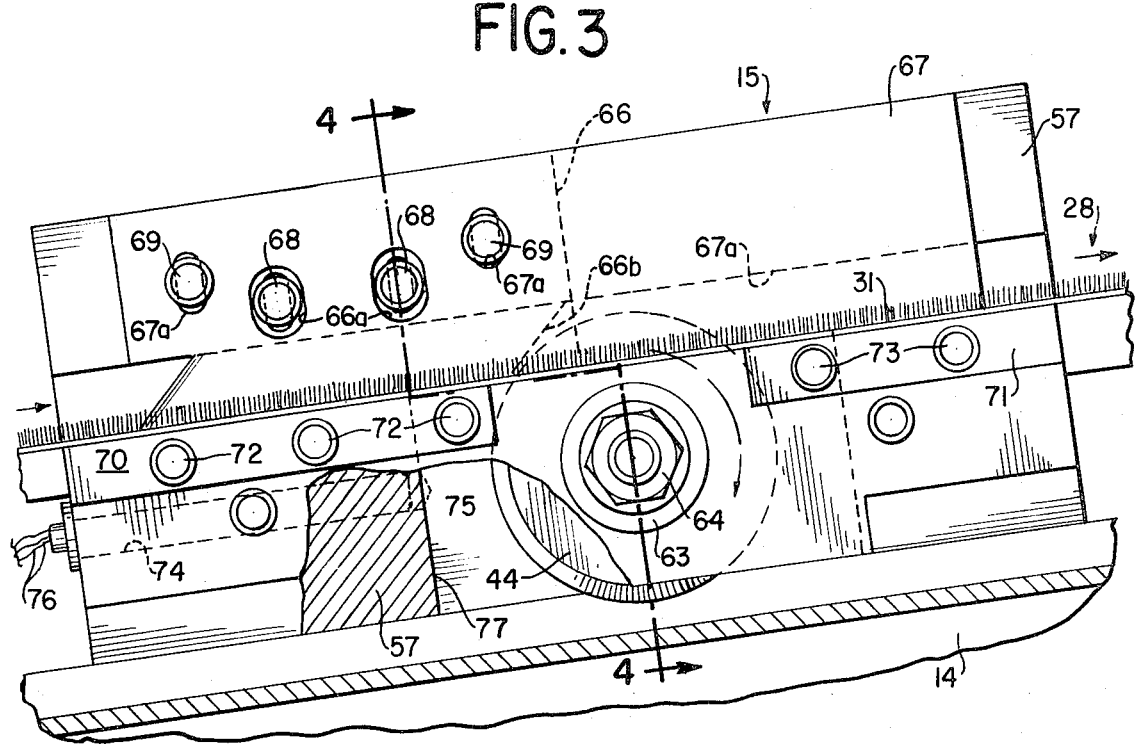
FIG. 3 is an enlarged detail of one of the cutting stations of the apparatus of FIG. 1.

Referring now to the drawing and initially to FIG. 1 thereof, a channel cloth slitting apparatus 10 constructed in accordance with the present invention has been illustrated. Apparatus 10 has a base 11 and upright frame members 12 which mount horizontal cross member 13. Supported on member 13 is an inclined bed 14 which mounts a series of cutting stations 15-20, the details of construction which will be described presently. At one end, a bracket 21 mounts a preheater 22 which, as shown in FIG. 2, consists of a block 23 which receives a heater element 24 having electrical power leads 25. The block 23 is recessed at 26 and enclosed by an upper plate 27. Channel cloth 28, having a plastic backing 29 (see FIG. 4) integrally attached to a backing layer 30, is constructed in the usual manner having a series of pile rows 31 (ten in number) extending therefrom. The heater 22 heats the plastic backing 29 as the channel cloth passes therethrough. The heater 22 operates at a temperature of approximately 250° F., which is somewhat lower than the melting temperature of polypropylene of which, in the present invention, the backing 29 consists. After passing through the heater 22, the channel cloth 28 passes under a roller 32 pivotally mounted to a post 34 by means of arms 35. After passing under roller 32, channel cloth 28 proceeds into the cutting stations 15–20 for slitting of the backing layers 29 and 30 to form separate weatherstripping.

As seen in FIG. 1, a motor 36 drives a gear reducer 37 through the belt and pully combination 38, 39 and 40. The output of the gear reducer 37 is taken off by means of sprocket 41 and chain 42 to an intermediate drive sprocket 43. The latter powers a series of rotary knives 44 by providing power to sprockets 45, 45a through chains 46, 46a, 46b, 47, 48 and 49. In addition, intermediate sprocket 43 provides power to a rubber covered drive roller 51 through the agency of chain 52. Driver roller 51 in turn provides power to the roller 53 by means of a spur gear drive (not shown). The rubber covered drive roller 51 engages the channel cloth weatherstrips 28a and draws these weatherstrips through the various cutting stations. After passing around roller 51, the slit strips proceed around roller 53 and idler roller 54 and a final drive roller 55. The latter is driven by chain 56 from another output sprocket 50 of the gear reducer 37.

Figure 4:
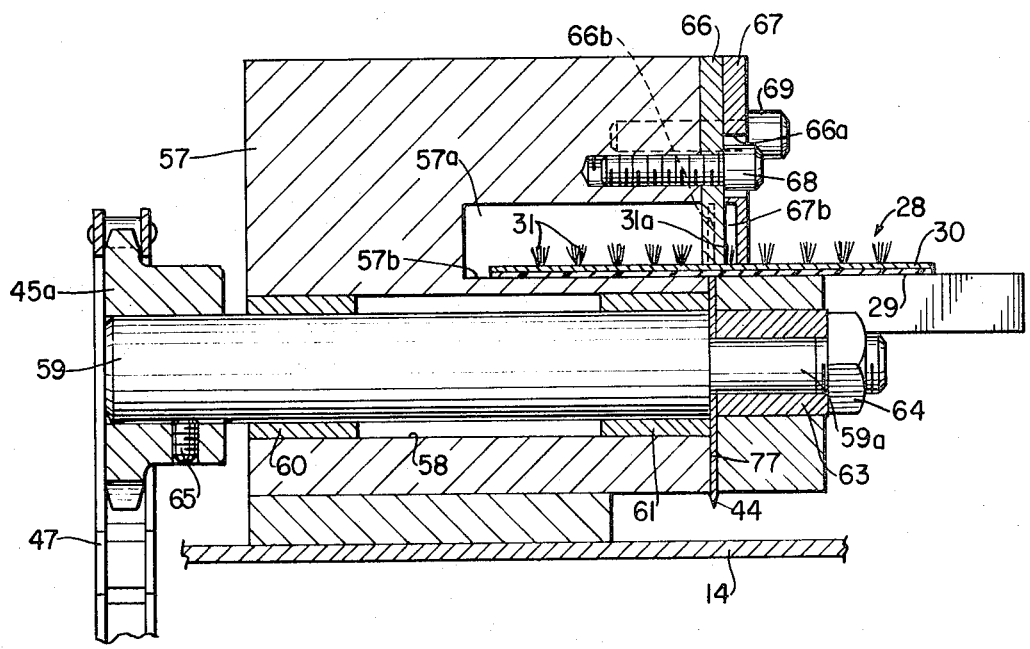
FIG. 4 is a cross section taken in the direction of arrows 4—4 of FIG. 3.

Referring now to FIGS. 3 and 4, details of cutting station 15 have been illustrated. It will be understood, however, that the details of cutting stations 16-20 are essentially the same. Cutting station 15, for convenience, makes a center cut between adjacent sections of channel cloth, each comprising five pile rows. Thereafter, sections 16–20 make successive slitting cuts of one of the halves produced by section 15, that is, a section of channel cloth having five pile rows. The other section of channel cloth passes through the apparatus 10 without slitting and is recycled subsequently to be slit into separate weatherstripping widths.

As seen in FIG. 4, section 15 includes a main block 57 having a bore 58 therethrough for the reception of drive shaft 59. Drive shaft 59 is secured for rotation within bore 58 by bushings 60, 61. A reduced diameter portion 59a of the shaft 59 extends through a rotary cutting knife 44 which is securely clamped against the end of the shaft 59 between bushing 63 and nut 64. A clearance slot 77 milled into the face of block 57 allows free rotation of the blade 44 while also aligning it in a precise lateral direction. The opposite end of the shaft is secured to sprocket 45a by means of set screw 65, the sprocket and shaft being driven by chain 47. Two pile centering guide plates 66, 67 are secured to a face of the block 57 by means of pairs of bolts 68, 69. These are movable in vertical slots 66a, 67a to provide vertical adjustment of the pile centering guide plates. Guide plate 67 has a recess 67b, which together with the side of plate 66 defines a guide slot through which a pile row 31a may pass. The lower ends of plates 66 and 67 ride upon the surface of backing 30 to hold same against the cutting section. Plate 66 is slotted at 66 b to provide clearance for the edge of the blade 62. Block 57 has a rectangular opening 57a for the passage of channel cloth 28. Channel cloth 28 rests upon a cutting surface 57b and in part defined by material support plates 70, 71 secured to the side of block 57 by bolts 72, 73.

Immediately beneath the leading edge portion of the block 57 is a bore 74 for the reception of a center heating element 75 having power leads 76. Heater element 75 maintains the temperature of the backing 29 at the level previously attained in heater 22.

The operation of the apparatus of FIGS. 1–4 is as follows: Channel cloth 28 pulled through preheater 22 by rollers 51, 53 passes beneath roller 32 and first proceeds into cutting section 15, which separates the ten-row wide strip of channel cloth into two strips of five pile rows each. Rotation of knives 44 is clockwise as viewed in FIG. 1, that is, in the same direction as the moving channel cloth 28, and it will be observed that the center of each knife is below the channel cloth 28 as the channel cloth moves toward the rotating knife blade. This aspect of cutting the backing layers 29 and 30 from below has been found to be extremely important in slitting the backing in a true line. Prior rotary knives were located above the channel cloth, and the knife in this position tends to crush while it cuts and does not cut truely; namely, in a straight line with respect to the theoretical movement of the cloth into the knife. It will also be seen particularly from FIG. 3 that at the tangential point of contact with the layers 29 and 30, the knife 62 is inclined rearwardly due to the curvature of the knife in relation to its center. It has been found that this rearward inclination of the knife edge (which will be seen repeated in connection with the fixed knife embodiment of FIGS. 5–8) is important in obtaining true cut. These factors taken together with the heating of the backing provided by heaters 22 and 75 are most important features of the present invention.

After passing through section 15, a width of channel cloth including five pile rows, then successively passes through cutting sections 16–20 and within each of these sections, a strip including one row of pile is slit therefrom. It will be noted that with respect to the cutting station 15 of FIG. 4, the technique of locating the position of the cut is to center a pile row 31a within the guide slot 67b. Thus, in this form of the apparatus of the invention, the dimension from the center of a row of pile 31 to the edge being cut is held very precisely.

It is, of course, true that the spacing between the pile row and its edge on the other side may vary to some degree depending upon the particular dimensions of individual channel cloth strips. For this reason, an alternate form of apparatus has been disclosed herein in FIGS. 5–8 which solves this problem and provides a widthwise dimension for each weatherstrip which is held precisely to prescribed dimension.

Referring to FIG. 5, there has been disclosed an alternate form of apparatus 10' which employs fixed rather than driven rotary knives but in other respects provides the same drive mechanism for pulling the channel cloth 28 through cutting sections 77 and 78 as was shown and described in connection with the apparatus of FIG. 1. Therefore, the same reference numerals have been used in FIG. 5 for the frame elements and driving mechanism.

Before moving through cutter sections 77 and 78, the channel cloth 28 first passes through a heater 79 constructed generally in a manner similar to heater 22. The channel cloth 28 then passes through the first cutting section 77 which slits the channel cloth into two strips each having five rows of pile each.

Thereafter, the two halves of channel cloth will pass through cutting section 78 which is a gang cutter and which will simultaneously slit the channel cloth into ten separate strips.

Figure 8:
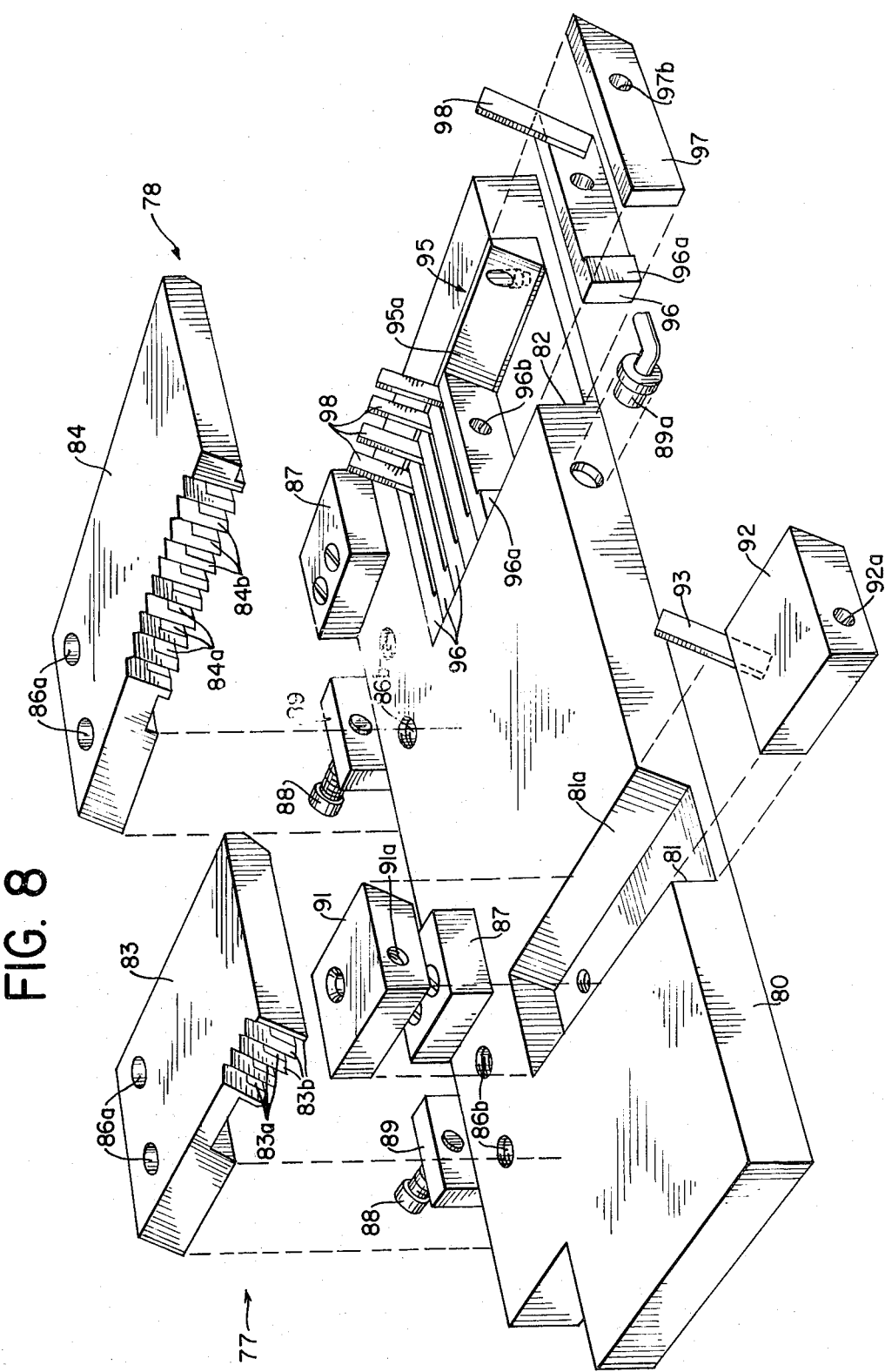
FIG. 8 is an exploded perspective view of a gang cutting station used in the apparatus of FIG. 5.

As seen in FIGS. 6–8, cutting sections 77 and 78 have a common base 80 having recessed areas 81 and 82. Pile guide plates 83 and 84 include a series of guide slots 83a, 84a having guide feet 83b, 84b defining spaces 83a, 84a for the reception of pile rows 31. Plates 83 and 84 are bolted to base plate 80 by means of bolts 86 through aligned bolt holes 86a, 86b which are slightly oversize to permit lateral adjustment of guide plates 83 and 84. Positioning blocks 87 prevent rearward movement of plates 83 and 84 while adjusting screws 88 through plates 89 can adjust the lateral position of plates 83 and 84 with respect to the base plate 80. A temperature sensing element 89a is received with base plate 80 for controlling the temperature of strip heater 90 secured to the base plate by mounting plate 91b.

Received with recess 81 immediately beneath plate 83 are two knife clamping blocks 91, 92 for clamping between them a stationary knife blade 93. The rearward face 81a of recess 81 is at an angle of 51° to the horizontal. Bolt 94 extends through bore 92a and into tapped hole 91a in clamping block 91, thus securing knife blade 93 between blocks 91 and 92. A knife angle block 95 is received within recess 82 whose side 95a is set at an angle 51° inclined rearwardly with respect to a horizontal reference. A series of clamping blocks 96 are provided for clamping knife blades 98 therebetween, the blocks 96 having shoulders 96a extending laterally therefrom slightly less than the thickness of each blade 98. A single unshouldered clamp element 97 and bolt 99 extending through bores 96b, 97b of blocks 96 and 97 secures the blocks together thus clamping all of the knife blades in position. It should be noted that different widths of blocks 96 and 97 can be provided. In a preferred embodiment, the widthwise dimension of each block 96, for example, is 0.265 inch with other blocks being provided respectively having dimensions of 0.260 inch and 0.255 inch. The purpose of these variations is to provide overall widths of the respective dimensions which can be varied to accomodate variations in center to center distances between pile rows in individual cases.

In operation, the apparatus of FIGS. 5–8 slits the channel cloth backing from below as in the prior embodiment of FIGS. 1–4. However, after the first center cut is made in cutting section 77, the two halves of channel cloth are pulled through the gang cutting section 78 wherein all of the cuts are made simultaneously to provide ten widths of weatherstripping. During the simultaneous cutting, the pile guide openings 84 receive the respective pile rows 31 and provide an overall centering effect, and the guide feet 84b press down on channel cloth backing 30. However, since the center to center distance between blades 98 is precisely fixed and each of the cuts is accomplished simultaneously, the overall width of each strip of weatherstripping is held precisely to a prescribed dimension. In this case, the center of each pile row to the adjacent edges of a strip may vary slightly but not greatly due to the overall centering effect of the pile guides. It will be appreciated, however, that with the form of the apparatus shown and described in connection with FIGS. 5–8, the width of a strip of weatherstripping can be held more accurately than with the apparatus of the preceeding embodiment. Furthermore, it should be noted that the rearwardly inclined angle at which the blades 98 are positioned greatly assist the smooth slitting of the channel cloth backing. The optimum angle of inclination has been found to be 51°. Thus, whether the invention be practiced with rotary circular knives as in the preceeding embodiment or with stationary knives, the cutting angle is rearwardly inclined and will produce a cut of very high quality.

Thus, in these respects, the method and apparatus of cutting are quite similar and the trueness of the cut similarly of high quality.

It will be understood that the foregoing description has related to particular embodiments of the invention, and is, therefore representative. In order to appreciate the scope of the invention, reference should be made to the appended claims.

I claim:

1. An apparatus for slitting channel cloth wherein said channel cloth includes a textile backing member coated on one side with a termoplastic material, said backing member being substantially impregnated with said thermoplastic material and having a plurality of parallel rows of weatherstripping pile upstanding from the other side thereof, said apparatus includes means for guiding said channel cloth by contact with a pile row thereof, cutting means for slitting said backing member and thermoplastic material intermediate said rows to form separate strips of weatherstripping, the improvement comprising: a planar guide surface; means for drawing said channel cloth along said guide surface with the thermoplastic coated side in contact with said surface; means for heating the backing member and thermoplastic material to a temperature which is less than the melting temperature of the thermoplastic material; bifurcated guide means straddling at least one of said rows of pile in contact with said backing member; knife means spaced laterally a predetermined distance from the center of said guide means and positioned for cutting the backing member and thermoplastic material as it is drawn along said guide surface; means to fix the lateral position of said guide means in relation to said guide surface; means for locating said knife means beneath said guide surface; and means for inclining the cutting portion of said knife means in the direction of travel of said channel cloth.

2. The apparatus according to claim 1 wherein said knife means is a circular rotary knife, and with means being provided for rotating said knife in the direction of travel of said channel cloth.

3. The apparatus according to claim 2 wherein a plurality of staggered rotary knives are located in series.

4. The apparatus according to claim 1 wherein said knife means is a stationary knife blade.

5. The apparatus according to claim 4 whrein said knife blade is inclined in the direction of travel of said channel cloth at an angle of approximately 51° to said guide surface.

6. The apparatus according to claim 4 wherein a plurality of knife blades are secured in side by side relation for simultaneous slitting of strips from said channel cloth.

* * * * *

PO-1050
(5/69)

UNITED STATES PATENT OFFICE
CERTIFICATE OF CORRECTION

Patent No. 3,796,118     Dated March 12, 1974

Inventor(s) RICHARD K. TEED

It is certified that error appears in the above-identified patent and that said Letters Patent are hereby corrected as shown below:

1. Column 4, line 31, delete -

[slots 83a, 84a having guide]

2. In claim 5, column 6, line 35

"whrein" should read --wherein--.

Signed and sealed this 24th day of September 1974.

(SEAL)
Attest:

McCOY M. GIBSON JR.          C. MARSHALL DANN
Attesting Officer             Commissioner of Patents